(12) United States Patent
Funabashi

(10) Patent No.: US 10,967,674 B2
(45) Date of Patent: Apr. 6, 2021

(54) DECORATIVE PART, WHEEL, AND FIXATION STRUCTURE OF DECORATIVE PART AND WHEEL

(71) Applicant: HONDA ACCESS CORP., Niiza (JP)

(72) Inventor: Masaya Funabashi, Niiza (JP)

(73) Assignee: HONDA ACCESS CORP., Niiza (JP)

( * ) Notice: Subject to any disclaimer, the term of this patent is extended or adjusted under 35 U.S.C. 154(b) by 0 days.

(21) Appl. No.: 16/288,406

(22) Filed: Feb. 28, 2019

(65) Prior Publication Data

US 2019/0291509 A1    Sep. 26, 2019

(30) Foreign Application Priority Data

Mar. 22, 2018   (JP) .............................. JP2018-054401

(51) Int. Cl.
    *B60B 7/06*    (2006.01)
    *B60B 3/10*    (2006.01)
    *B60B 7/14*    (2006.01)

(52) U.S. Cl.
    CPC ................ *B60B 7/065* (2013.01); *B60B 3/10* (2013.01); *B60B 7/14* (2013.01)

(58) Field of Classification Search
    CPC .... B60B 7/00; B60B 7/04; B60B 7/06; B60B 7/065; B60B 7/14
    See application file for complete search history.

(56) References Cited

U.S. PATENT DOCUMENTS

| | | | | |
|---|---|---|---|---|
| 7,055,915 B2 * | 6/2006 | Fitzgerald | ................. | B60B 3/10 |
| | | | | 301/37.102 |
| 8,864,242 B2 * | 10/2014 | Mengle | ..................... | B60B 7/04 |
| | | | | 301/37.102 |
| 2010/0231029 A1 * | 9/2010 | Russell | ..................... | B60B 7/10 |
| | | | | 301/37.31 |
| 2011/0291465 A1 | 12/2011 | Peschiutta et al. | | |
| 2013/0069422 A1 | 3/2013 | Li | | |
| 2018/0056714 A1 * | 3/2018 | Maji | ......................... | B60B 7/02 |
| 2019/0184735 A1 * | 6/2019 | Van Houten | .............. | B60B 5/00 |

FOREIGN PATENT DOCUMENTS

JP    2002-79801 A    3/2002

OTHER PUBLICATIONS

Notification of Reasons for Refusal dated Aug. 20, 2019, issued in counterpart Japanese Application No. 2018-054401, with English translation. (4 pages).
Office Action dated Aug. 20, 2019, issued in counterpart JP Application No. 2018-054401, with English translation (4 pages).

* cited by examiner

*Primary Examiner* — Jason R Bellinger
(74) *Attorney, Agent, or Firm* — Westerman, Hattori, Daniels & Adrian, LLP

(57) ABSTRACT

Provided are a decorative part, a wheel, and a fixation structure of such decorative part and wheel that are unaffected by variations in sizes at the time of manufacturing. The decorative part is to be attached to a vehicular wheel. This decorative part has the fixation portions to be fixed to the wheel; and the first plate-shaped ribs and the second plate-shaped ribs that are arranged at given intervals. The decorative part is to be fixed to the wheel with linear convex portions formed on the wheel being arranged in between and positioned to the first plate-shaped ribs and the second plate-shaped ribs.

15 Claims, 10 Drawing Sheets

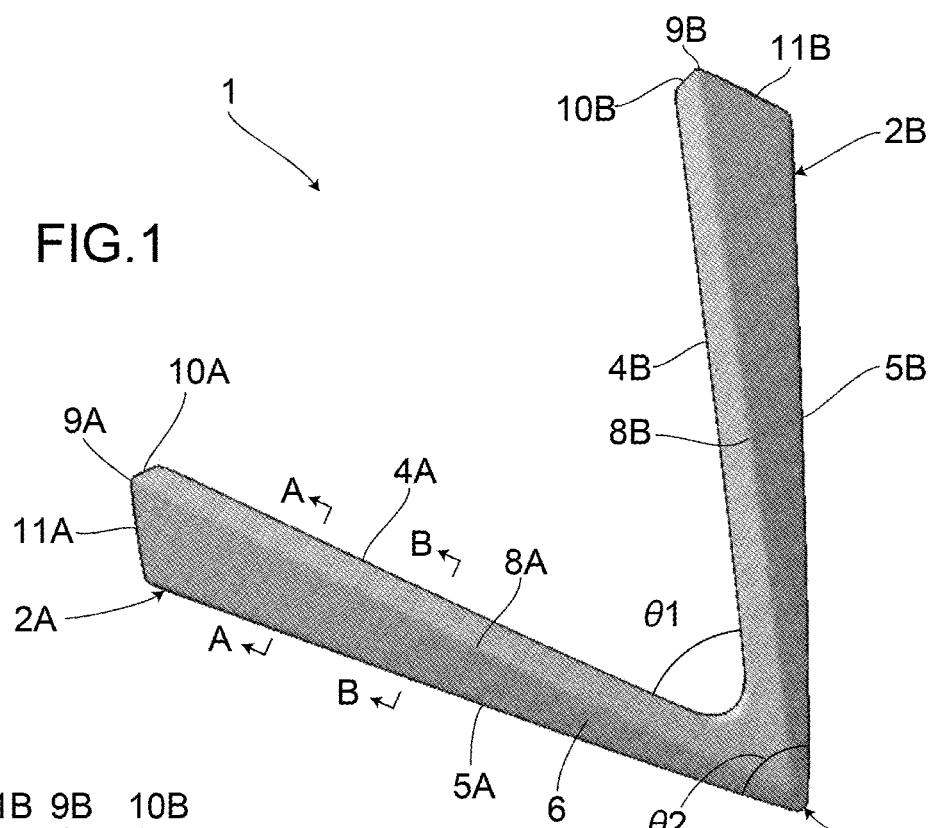
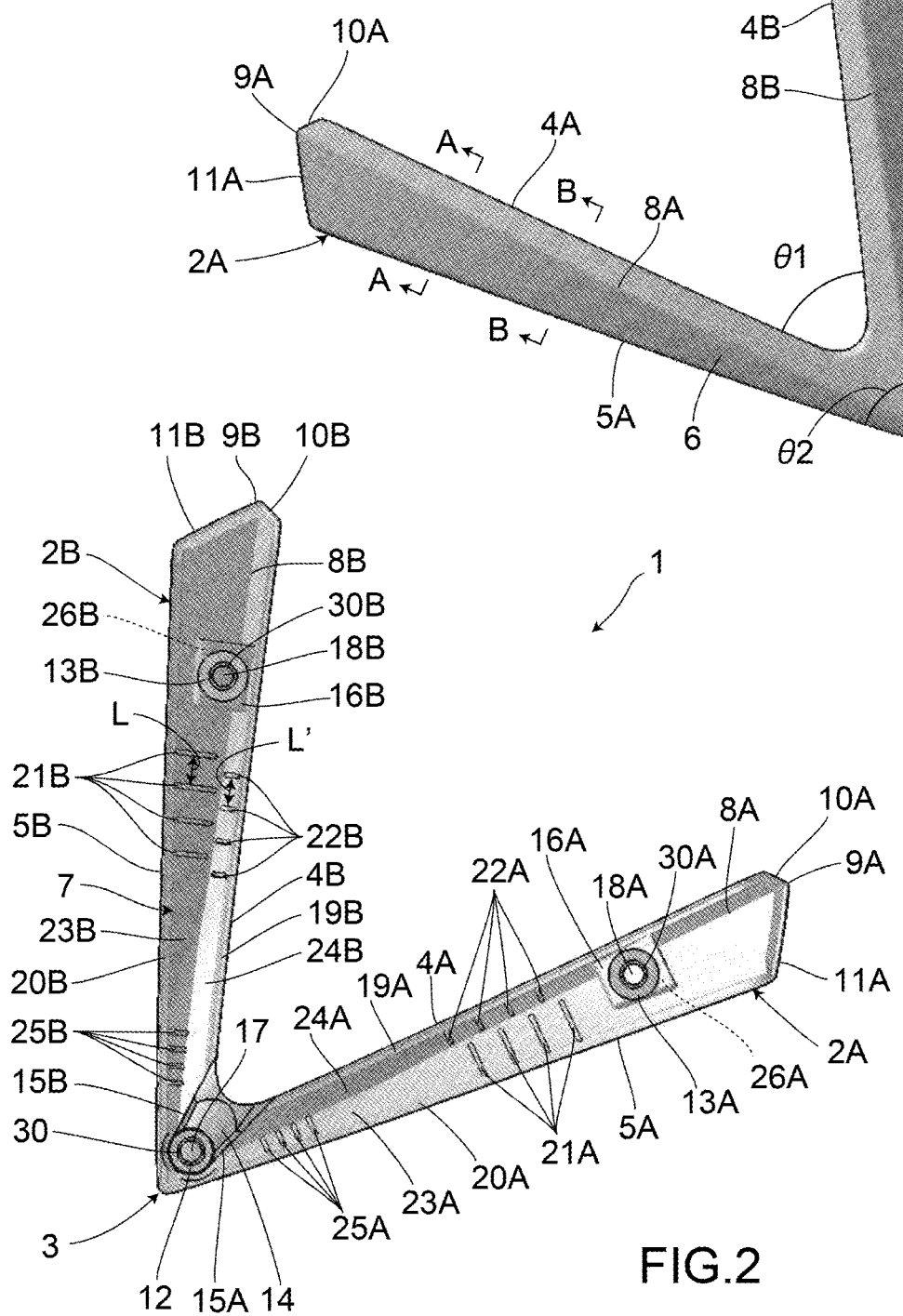

US 10,967,674 B2

DECORATIVE PART, WHEEL, AND FIXATION STRUCTURE OF DECORATIVE PART AND WHEEL

TECHNICAL FIELD

The present invention relates to a decorative part to be attached to a vehicular wheel; a wheel; and a fixation structure of such decorative part and wheel.

BACKGROUND ART

Conventionally, as a method for decorating a vehicular wheel, there is known a method in which a plurality of concave regions with a given depth are to be formed on the spoke portions of a wheel, and a decorative part is then fitted to these concave regions (see Patent document 1). This decorative part is attached and fitted in a way such that it is, for example, press-fitted into the concave regions, or installed through a fastener member(s) such as a bolt, a nut and/or a fastener.

PRIOR ART DOCUMENT

Patent Document

[Patent document 1]
Japanese Unexamined Patent Application Publication No. 2002-79801

SUMMARY OF THE INVENTION

Problem to be Solved by the Invention

However, these concave regions and decorative part exhibit a certain degree of variation in size at the time of manufacturing. Whenever such variations occur, there has been a problem that a design nature will be impaired as gaps S1 and S2 shown in FIG. 3 of the Patent document 1 will occur. A decorative part is usually attached to decorate a wheel, and thus constitutes a part a consumer(s) and others watch carefully. In this regard, the problem is that when the gaps are noticeable, the consumer(s) and others will easily get an impression that the decorative part and the wheel are separated from each other.

Further, while a lighter wheel is desired, a wheel is also required to have a certain or higher degree of strength. In this regard, when there are provided the concave regions on a wheel as is the case with the Patent document 1, the shape of the wheel is thus subjected to restrictions in terms of design, which incurs a problem that the degree of freedom in design will be extremely low.

Here, the present invention is to solve the aforementioned problems, and it is an object of the invention to provide a decorative part, a wheel, and a fixation structure of such decorative part and wheel that are unaffected by variations in sizes at the time of manufacturing.

Effects of the Invention

The present invention allows the decorative part to be fixed to the wheel with the linear convex portions being arranged in between and positioned to the first positioning portions and the second positioning portions. Further, the decorative part can be fixed to the wheel without being affected by the variations in the sizes of these decorative part and wheel that occur at the time of manufacturing.

BRIEF DESCRIPTION OF THE DRAWINGS

FIG. 1 shows a front surface of a decorative part of a first embodiment of the invention.
FIG. 2 shows a rear surface of the decorative part of the first embodiment.

MODE FOR CARRYING OUT THE INVENTION

Embodiments of the present invention are described hereunder with reference to the accompanying drawings FIG. 1 to FIG. 17. The embodiments described hereunder are not to limit the contents of the present invention that are described in the claims. Further, not all the elements described hereunder are necessarily the essential elements of the present invention.

First Embodiment

A first embodiment of the present invention is shown in FIG. 1 to FIG. 15. A decorative part 1 is made of a polycarbonate (PC) resin and an ABS resin; and is substantially formed into the shape of "V." Here, the decorative part 1 may also be made of other types of hard synthetic resin.

Figure 3:
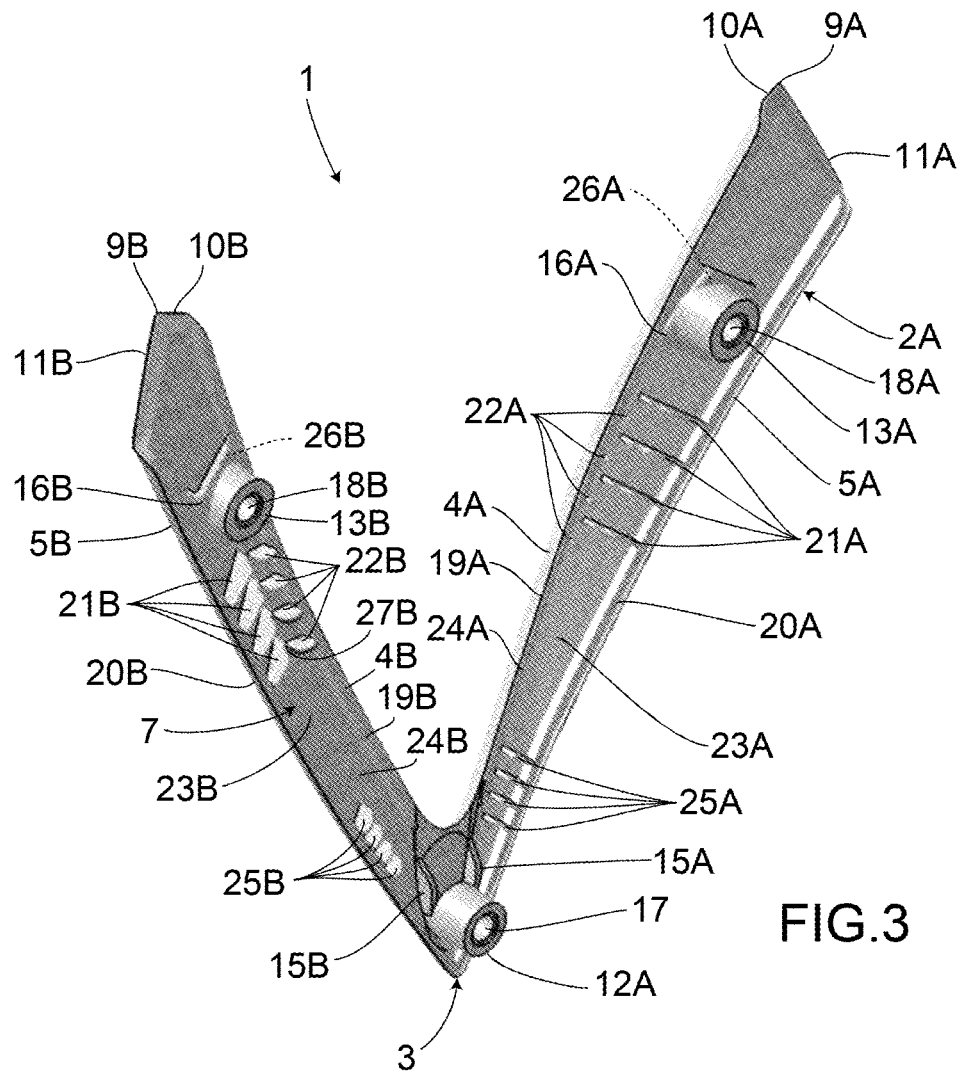
FIG. 3 is a perspective view showing the rear surface of the decorative part of the first embodiment.
Figure 4:
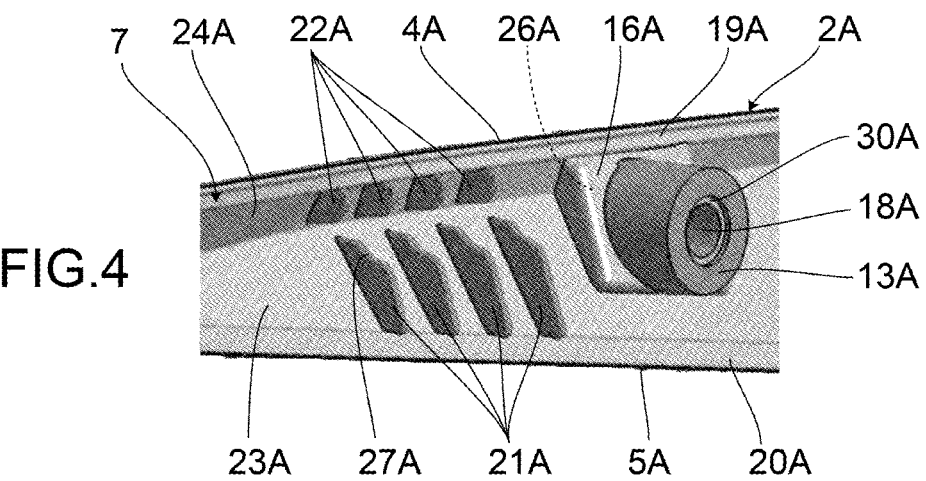
FIG. 4 is an enlarged view showing a main portion on the rear surface of the decorative part of the first embodiment.

As shown in FIG. 1 to FIG. 3, the decorative part 1 is configured in a way such that a first main body portion 2A and a second main body portion 2B are integrally joined together at a joining section 3. An angle θ1 formed between an inner edge portion 4A of the first main body portion 2A and an inner edge portion 4B of the second main body portion 2B is about 60 degrees; and angle θ2 formed between an outer edge portion 5A of the first main body portion 2A and an outer edge portion 5B of the second main body portion 2B is about 70 degrees. As for each of the first main body portion 2A and the second main body portion 2B, a front surface 6 as a surface appearing on the front side with the decorative part 1 being attached to a wheel 31 of a vehicle (not shown) is formed into an inverted V shape such as a mountain fold, and a rear surface 7 as a surface appearing on the rear side with the decorative part 1 being attached to the wheel 31 is formed into a V shape such as a valley fold. Slanting end portions 10A, 10B and slanting end portions 11A, 11B are formed on opposite sides of the joining section 3 by which the first and second main body portions 2A and 2B are joined together. The slanting end portions 10A and 10B individually and obliquely extend from front end portions 9A, 9B of inverted V-shaped ridge line portions 8A, 8B toward the inner edge portions 4A, 4B; and the slanting end portions 11A and 11B individually and obliquely extend from the tip end portions 9A, 9B toward the outer edge portions 5A, 5B.

As shown in FIG. 2, the rear surface 7 of the decorative part 1 is configured in a way such that cylindrical fixation portions 12, 13A and 13B are respectively formed on the joining section 3, a part of the first main body portion 2A nearer the slanting end portions 10A and 11A, and a part of the second main body portion 2B nearer the slanting end portions 10B and 11B. Formed in the fixation portion 12 is a concave groove section 14 as a shallow concave groove formed on the joining section 3. Low wall portions 15A, 15B joined to the fixation portion 12 are erected from the concave groove section 14. The fixation portions 13A and 13B are respectively formed on rectangular base portions 16A and 16B. The fixation portions 12, 13A and 13B are respectively provided with embedding holes 17, 18A and 18B into which a later-described insert nut(s) 28 (see FIG. 14) is to be embedded. Further, on the rear surface 7 of the decorative part 1, slightly raised inner wall portions 19A, 19B are respectively formed on the inner edge portion 4A of the first main body portion 2A and the inner edge portion 4B of the second main body portion 2B, and slightly raised outer wall portions 20A, 20B are also respectively formed on the outer edge portion 5A of the first main body portion 2A and the outer edge portion 5B of the second main body portion 2B. Since the concave groove section 14 is formed in the joining section 3, the inner wall portion 19A and the inner wall portion 19B are not joined together at the joining section 3, while the outer wall portion 20A and the outer wall portion 20B are joined together at the joining section 3.

On the rear surface 7 of the decorative part 1, specifically in a region between the fixation portion 12 and the fixation portion 13A that is closer to the fixation portion 13A, there are erected four first plate-shaped ribs 21A that are formed into the shapes of thin plates, and serve as first positioning portions; and four second plate-shaped ribs 22A that serve as second positioning portions. The first plate-shaped ribs 21A are formed on an outer surface portion 23A as a surface on the outer side with respect to the ridge line portion 8A, and the second plate-shaped ribs 22A are formed on an inner surface portion 24A as a surface on the inner side with respect to the ridge line portion 8A. Further, the first plate-shaped ribs 21A and the second plate-shaped ribs 22A are extended in a direction substantially parallel to a direction orthogonal to the longitudinal direction of the first main body portion 2A that is a direction along which the ridge line portion 8A extends. Thus, with the decorative part 1 being attached to the wheel 31, the first plate-shaped ribs 21A and the second plate-shaped ribs 22A are substantially parallel to a rotation direction of the wheel 31.

The four first plate-shaped ribs 21A are substantially arranged at an equal interval, and the four second plate-shaped ribs 22A are substantially arranged at an equal interval as well. A clearance L between the neighboring first plate-shaped ribs 21A is substantially identical to a clearance L' between the neighboring second plate-shaped ribs 22A. However, since the first plate-shaped ribs 21A are deviated away from the second plate-shaped ribs 22A toward the fixation portion 13A by a half of L i.e. ½ L (≈½ L'), the first plate-shaped ribs 21A and the second plate-shaped ribs 22A are in fact not arranged in a straight line, but are arranged in a staggered manner i.e. parallel and alternating manner. If the first plate-shaped ribs 21A and the second plate-shaped ribs 22A are not to be arranged in a staggered manner but in a straight line, sink marks will occur easily on the front surface 6 when molding the decorative part 1. That is, the occurrence of sink marks can be controlled by arranging the first plate-shaped ribs 21A and the second plate-shaped ribs 22A in a staggered manner. Further, there exists a problem that the strengths of portions of a mold (not shown) for molding the decorative part 1 that correspond to the first plate-shaped ribs 21A and the second plate-shaped ribs 22A will be impaired if the first plate-shaped ribs 21A and the second plate-shaped ribs 22A are to be arranged in straight lines. Here, the strength of the mold can be ensured by arranging the first plate-shaped ribs 21A and the second plate-shaped ribs 22A in a staggered manner. However, the displacements by which the first plate-shaped ribs 21A and the second plate-shaped ribs 22A are deviated from one another may be modified, or the first plate-shaped ribs 21A and the second plate-shaped ribs 22A may even be arranged in straight lines, if sink marks do not occur on the decorative part 1, and the strength of the mold can be ensured, due to, for example, the thicknesses of the first plate-shaped ribs 21A and the second plate-shaped ribs 22A. Further, as long as later-described linear convex portions 42A to 42J of the wheel 31 can be reliably positioned, the number of the first plate-shaped ribs 21A and the second plate-shaped ribs 22A may be either increased or decreased, and the number of the first plate-shaped ribs 21A and the number of the second plate-shaped ribs 22A do not have to be the same.

On the rear surface 7 of the decorative part 1, four third plate-shaped ribs 25A formed into the shapes of thin plates are erected in a region of the outer surface portion 23A nearer the fixation portion 12. The four third plate-shaped ribs 25A are substantially arranged at an equal interval. Further, the third plate-shaped ribs 25A are extended in a direction orthogonal to the longitudinal direction of the first main body portion 2A that is the direction along which the ridge line portion 8A extends. Thus, with the decorative part 1 being attached to the wheel 31, the third plate-shaped ribs 25A are substantially parallel to the rotation direction of the wheel 31.

As is the case with the first main body portion 2A, the second main body portion 2B has four first plate-shaped ribs 21B, four third plate-shaped ribs 25B and four second plate-shaped ribs 22B. The first plate-shaped ribs 21B as first positioning portions and the third plate-shaped ribs 25B as second positioning portions are formed into the shapes of thin plates, and are provided on an outer surface portion 23B as a surface on the outer side with respect to the ridge line portion 8B. The second plate-shaped ribs 22B are also formed into the shapes of thin plates, and are provided on an inner surface portion 24B as a surface on the inner side with respect to the ridge line portion 8B.

Figure 5:
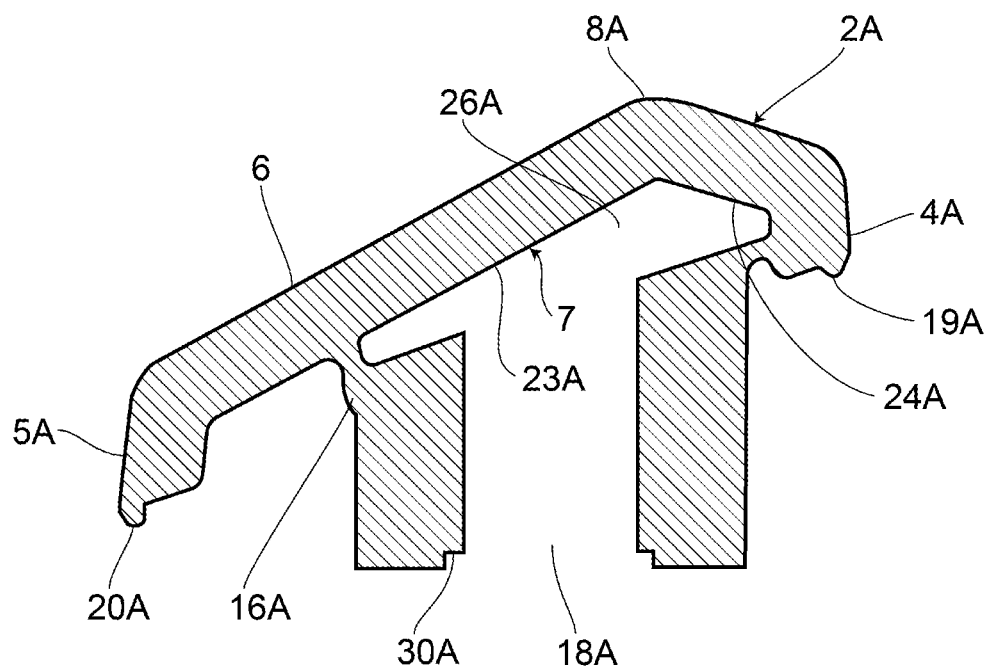
FIG. 5 is an A-A cross-sectional view of the decorative part of the first embodiment.

As shown in FIG. 5, a space 26A is formed among the base portion 16A, the outer surface portion 23A and the inner surface portion 24A. A space 26B (see FIG. 2 to FIG. 4) is also formed between the base portion 16B of the second main body portion 2B and the outer surface portion 23B as well as the inner surface portion 24B. These spaces 26A, 26B make it difficult for sink marks to occur on the front surface 6 when molding the decorative part 1.

Figure 6:
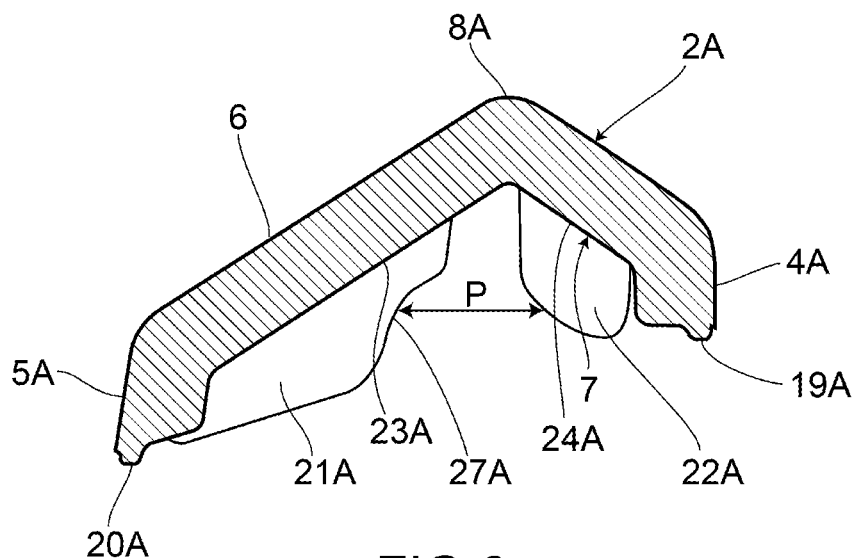
FIG. 6 is a B-B cross-sectional view of the decorative part of the first embodiment.

As shown in FIG. 6, each first plate-shaped rib 21A has an arc-shaped concave portion 27A substantially dented in an arc-like manner toward each second plate-shaped rib 22A. Here, since the shapes of the first plate-shaped ribs 21B are identical to those of the first plate-shaped ribs 21A, each first plate-shaped rib 21B also has an arc-shaped concave portion 27B (see FIG. 3). The arc-shaped concave portions 27A, 27B and the second plate-shaped ribs 22A, 22B are respectively distant from one another by a given distance P in a cross-sectional view taken along a line B-B. The later-described linear convex portions 42A to 42J are to be respectively arranged between these arc-shaped concave portions 27A, 27B and the second plate-shaped ribs 22A, 22B. Here, as long as the linear convex portions 42A to 42J can be reliably arranged, the first plate-shaped ribs 21A, 21B, the arc-shaped concave portions 27A, 27B and the second plate-shaped ribs 22A, 22B may be formed into other types of shapes.

The wheel 31 is shown in FIG. 7 to FIG. 11. The wheel 31 has a rim portion 32 as an outer circumference portion; a hub portion 33 as a center portion; and 10 spoke portions 34A, 34B, 34C, 34D, 34E, 34F, 34G, 34H, 34I, 34J joining the rim portion 32 and the hub portion 33. The wheel 31 is made of an aluminum alloy, and a valve hole 35 is bored in the rim portion 32.

A bolt hole 36 used to attach the wheel 31 to the vehicle is bored at five locations in the hub portion 33 at an equal interval. Bored between the neighboring bolt holes 36 are insertion holes 38A, 38B, 38C, 38D and 38E through which bolts 37 (see FIG. 14) for attaching the decorative part 1 to the wheel 31 are to be inserted. Fixation receiving portions 39A, 39B, 39C, 39D and 39E as circular grooves are respectively formed around the insertion holes 38A, 38B, 38C, 38D and 38E.

Flat surface portions 41A, 41B, 41C, 41D, 41E, 41F, 41G, 41H, 41I and 41J that are flush with an end surface portion 40 of the rim portion 32 are respectively formed on the spoke portions 34A to 34J. Further, insertion holes 38F, 38G, 38H, 38I, 38J, 38K, 38L, 38M, 38N and 38O through which bolts for attaching the decorative part 1 to the wheel 31 are to be inserted, are respectively formed on the spoke portions 34A to 34J. Furthermore, fixation receiving portions 39F, 39G, 39H, 39I, 39J, 39K, 39L, 39M, 39N and 39O as circular grooves are respectively formed around the insertion holes 38F to 38O.

Figure 7:
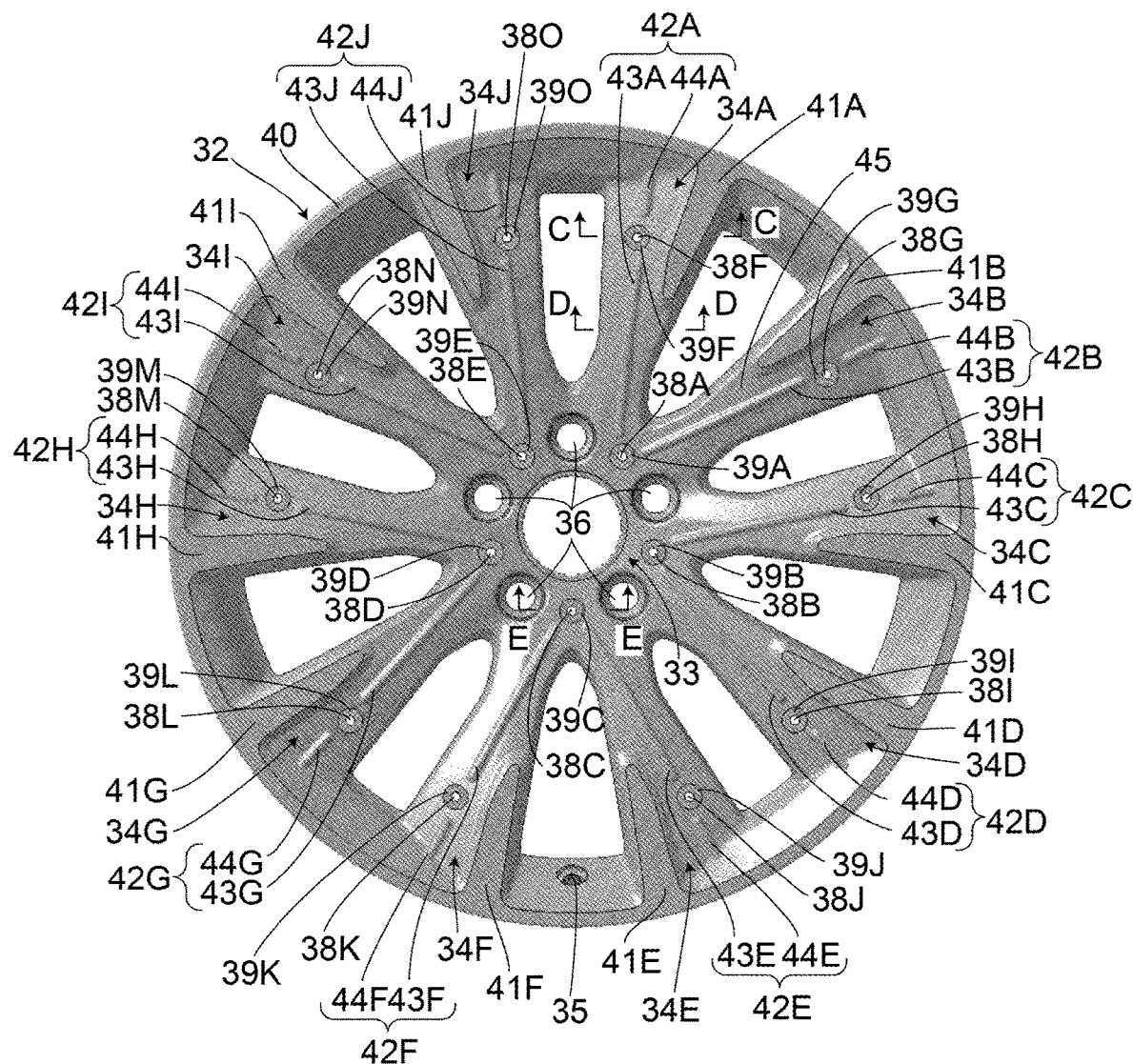
FIG. 7 is a front view of a wheel of the first embodiment.
Figure 8:
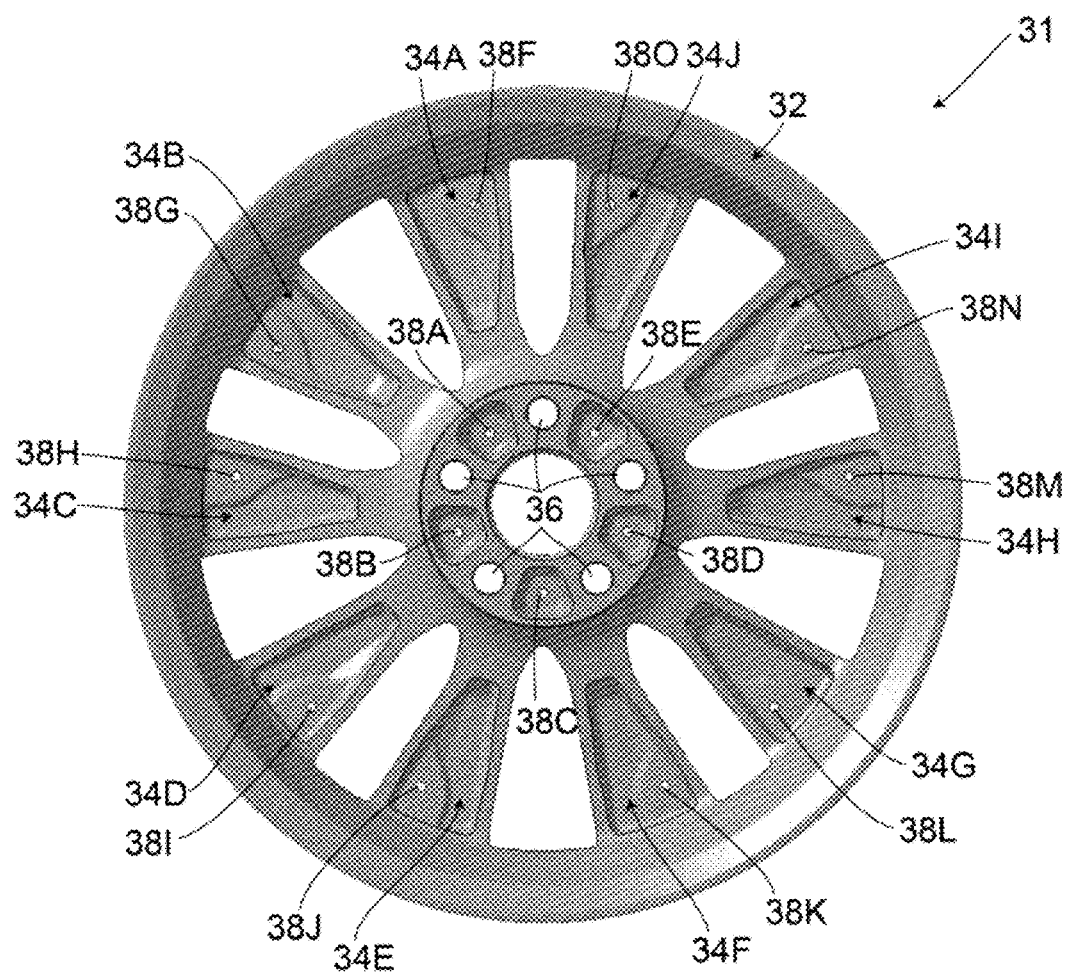
FIG. 8 is a rear view of the wheel of the first embodiment.
Figure 9:
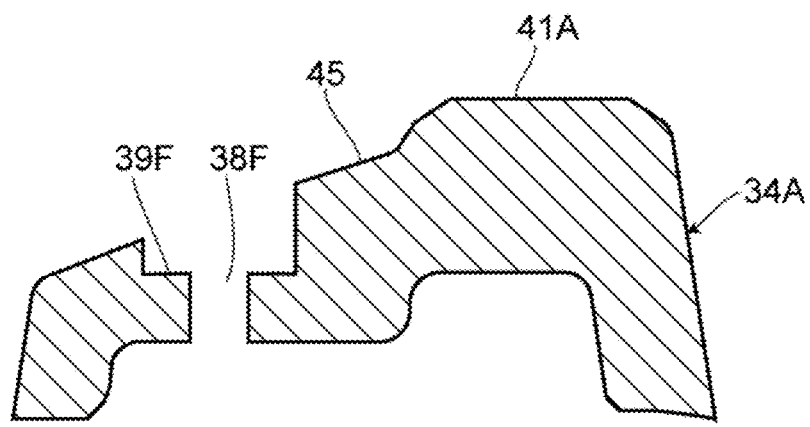
FIG. 9 is a C-C cross-sectional view of the wheel of the first embodiment.
Figure 10:
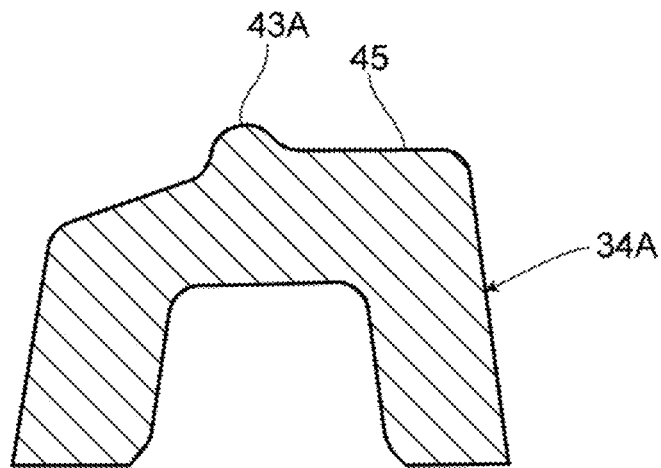
FIG. 10 is a D-D cross-sectional view of the wheel of the first embodiment.
Figure 11:
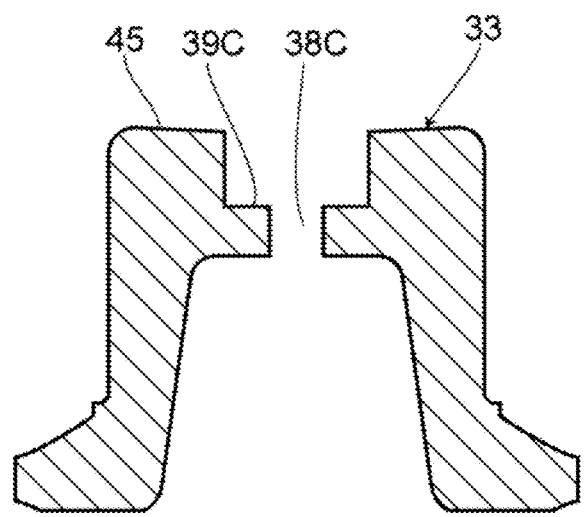
FIG. 11 is an E-E cross-sectional view of the wheel of the first embodiment.

As shown in FIG. 7 and FIG. 10, linear convex portions 42A, 42B, 42C, 42D, 42E, 42F, 42G, 42H, 42I and 42J are respectively formed on the spoke portions 34A to 34J. The linear convex portions 42A to 42J are respectively composed of inner linear convex portions 43A, 43B, 43C, 43D, 43E, 43F, 43G, 43H, 43I and 43J that are formed closer to the hub portion 33 than the insertion holes 38F to 38O; and outer linear convex portions 44A, 44B, 44C, 44D, 44E, 44F, 44G, 44H, 44I and 44J that are formed closer to the rim portion 32 than the insertion holes 38F to 38O. The inner linear convex portions 43A to 43J are formed longer than the outer linear convex portions 44A to 44J. The linear convex portions 42A to 42J are linearly extended on a front surface 45 facing the decorative part 1; and as shown in FIG. 10, are substantially protruded therefrom in an arc-like manner in a cross-sectional view taken along a line D-D. Here, since there are formed the insertion holes 38F to 38O and the fixation receiving portions 39F to 39O, the linear convex portions 42A to 42J of this embodiment are configured in a way such that they are respectively divided into the inner linear convex portions 43A to 43J and the outer linear convex portions 44A to 44J. However, there may be employed a configuration with no division by, for example, displacing the insertion holes 38F to 38O and the fixation receiving portions 39F to 39O; or there may be employed a configuration where each linear convex portion is divided into three or more parts.

The flat surface portion 41A is formed closer to the spoke portion 34B than the linear convex portion 42A; the flat surface portion 41B is formed closer to the spoke portion 34A than the linear convex portion 42B; the flat surface portion 41C is formed closer to the spoke portion 34D than the linear convex portion 42C; the flat surface portion 41D is formed closer to the spoke portion 34C than the linear convex portion 42D; the flat surface portion 41E is formed closer to the spoke portion 34F than the linear convex portion 42E; the flat surface portion 41F is formed closer to the spoke portion 34E than the linear convex portion 42F; the flat surface portion 41G is formed closer to the spoke portion 34H than the linear convex portion 42G; the flat surface portion 41H is formed closer to the spoke portion 34G than the linear convex portion 42H; the flat surface portion 41I is formed closer to the spoke portion 34J than the linear convex portion 42I; and the flat surface portion 41J is formed closer to the spoke portion 34I than the linear convex portion 42J.

The shapes of the spoke portions 34A, 34C, 34E, 34G and 34I are identical to one another; and the shapes of the spoke portions 34B, 34D, 34F, 34H and 34J are identical to one another.

Here, a method for attaching the decorative part 1 to the wheel 31 is described. At first, insert nuts 28 (see FIG. 14) are to be embedded into the embedding holes 17, 18A, 18B of the fixation portions 12, 13A, 13B of the decorative part 1. Although the insert nut 28 used in this embodiment is that of a so-called extension type, this insert nut may also be that capable of being embedded into the decorative part 1 via press fitting and/or thermal press fitting after molding the decorative part 1. As shown in FIG. 2, formed on the fixation portions 12, 13A, 13B are regulation portions 30, 30A, 30B that are capable of abutting against flange portions 29 (see FIG. 14) formed on the insert nuts 28.

Next, the fixation portions 12, 13A, 13B of the decorative part 1 are to be respectively arranged inside the fixation receiving portions 39A, 39F, 39G of the wheel 31. At that time, the linear convex portion 42A of the wheel 31 is to be arranged between the first plate-shaped ribs 21A and the second plate-shaped ribs 22A of the decorative part 1, and engages with the first plate-shaped ribs 21A and the second plate-shaped ribs 22A. Further, the linear convex portion 42B is to be arranged between the first plate-shaped ribs 21B and the second plate-shaped ribs 22B, and the linear convex portion 42A engages with the first plate-shaped ribs 21A and the second plate-shaped ribs 22A. Furthermore, the inner linear convex portion 43A and the inner linear convex portion 43B are to be arranged between the third plate-shaped ribs 25A and the third plate-shaped ribs 25B, where the inner linear convex portion 43A engages with the third plate-shaped ribs 25A, and the inner linear convex portion 43B engages with the second plate-shaped ribs 22A. Thus, the decorative part 1 can be reliably positioned through the first plate-shaped ribs 21A, 21B; the second plate-shaped ribs 22A, 22B; and the third plate-shaped ribs 25A, 25B. Next, the bolts 37 inserted through stainless washers 46 are to be inserted through the insertion holes 38A, 38F and 38G from the rear side of the wheel 31 so as to allow the bolts 37 and the insert nuts 28 to be screwed together.

Likewise, the fixation portions 12, 13A, 13B of the decorative part 1 with the insert nuts 28 already embedded in the embedding holes 17, 18A, 18B are to be respectively arranged inside the fixation receiving portions 39B, 39H, 39I of the wheel 31, the linear convex portion 42C is to be arranged between the first plate-shaped ribs 21A and the second plate-shaped ribs 22A, the linear convex portion 42D is to be arranged between the first plate-shaped ribs 21B and the second plate-shaped ribs 22B, and the inner linear convex portion 43C and the inner linear convex portion 43D are to be arranged between the third plate-shaped ribs 25A and the third plate-shaped ribs 25B. At that time, the linear convex portion 42C engages with the first plate-shaped ribs 21A and the second plate-shaped ribs 22A, the linear convex portion 42D engages with the first plate-shaped ribs 21B and the second plate-shaped ribs 22B, the inner linear convex portion 43C engages with the third plate-shaped ribs 25A, and the inner linear convex portion 43D engages with the third plate-shaped ribs 25B. Next, the bolts 37 inserted through the stainless washers 46 are to be inserted through the insertion holes 38B, 38H and 38I from the rear side of the wheel 31 so as to allow the bolts 37 and the insert nuts 28 to be screwed together.

Further, the fixation portions 12, 13A, 13B of the decorative part 1 with the insert nuts 28 already embedded in the embedding holes 17, 18A, 18B are to be respectively arranged inside the fixation receiving portions 39C, 39J, 39K of the wheel 31, the linear convex portion 42E is to be arranged between the first plate-shaped ribs 21A and the second plate-shaped ribs 22A, the linear convex portion 42F is to be arranged between the first plate-shaped ribs 21B and the second plate-shaped ribs 22B, and the inner linear convex portion 43E and the inner linear convex portion 43F are to be arranged between the third plate-shaped ribs 25A and the third plate-shaped ribs 25B. At that time, the linear convex portion 42E engages with the first plate-shaped ribs 21A and the second plate-shaped ribs 22A, the linear convex portion 42F engages with the first plate-shaped ribs 21B and the second plate-shaped ribs 22B, the inner linear convex portion 43E engages with the third plate-shaped ribs 25A, and the inner linear convex portion 43F engages with the third plate-shaped ribs 25B. Next, the bolts 37 inserted through the stainless washers 46 are to be inserted through the insertion holes 38C, 38J and 38K from the rear side of the wheel 31 so as to allow the bolts 37 and the insert nuts 28 to be screwed together.

Further, the fixation portions 12, 13A, 13B of the decorative part 1 with the insert nuts 28 already embedded in the embedding holes 17, 18A, 18B are to be respectively arranged inside the fixation receiving portions 39D, 39L, 39M of the wheel 31, the linear convex portion 42G is to be arranged between the first plate-shaped ribs 21A and the second plate-shaped ribs 22A, the linear convex portion 42H is to be arranged between the first plate-shaped ribs 21B and the second plate-shaped ribs 22B, and the inner linear convex portion 43G and the inner linear convex portion 43H are to be arranged between the third plate-shaped ribs 25A and the third plate-shaped ribs 25B. At that time, the linear convex portion 42G engages with the first plate-shaped ribs 21A and the second plate-shaped ribs 22A, the linear convex portion 42H engages with the first plate-shaped ribs 21B and the second plate-shaped ribs 22B, the inner linear convex portion 43G engages with the third plate-shaped ribs 25A, and the inner linear convex portion 43H engages with the third plate-shaped ribs 25B. Next, the bolts 37 inserted through the stainless washers 46 are to be inserted through the insertion holes 38D, 38L and 38M from the rear side of the wheel 31 so as to allow the bolts 37 and the insert nuts 28 to be screwed together.

In the end, the fixation portions 12, 13A, 13B of the decorative part 1 with the insert nuts 28 already embedded in the embedding holes 17, 18A, 18B are to be respectively arranged inside the fixation receiving portions 39E, 39N, 39O of the wheel 31, the linear convex portion 42I is to be arranged between the first plate-shaped ribs 21A and the second plate-shaped ribs 22A, the linear convex portion 42J is to be arranged between the first plate-shaped ribs 21B and the second plate-shaped ribs 22B, and the inner linear convex portion 43I and the inner linear convex portion 43J are to be arranged between the third plate-shaped ribs 25A and the third plate-shaped ribs 25B. At that time, the linear convex portion 42I engages with the first plate-shaped ribs 21A and the second plate-shaped ribs 22A, the linear convex portion 42J engages with the first plate-shaped ribs 21B and the second plate-shaped ribs 22B, the inner linear convex portion 43I engages with the third plate-shaped ribs 25A, and the inner linear convex portion 43J engages with the third plate-shaped ribs 25B. Next, the bolts 37 inserted through the stainless washers 46 are to be inserted through the insertion holes 38E, 38N and 38O from the rear side of the wheel 31 so as to allow the bolts 37 and the insert nuts 28 to be screwed together. In this way, a state shown in FIG. 12 and FIG. 13 will be achieved after finishing attaching five decorative parts 1 to the wheel 31.

Figure 15:
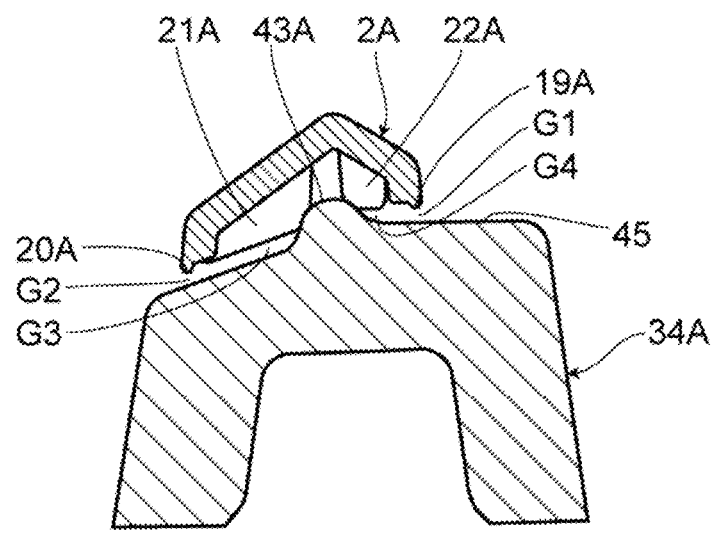
FIG. 15 is a G-G cross-sectional view of the decorative part and the wheel of the first embodiment.

As shown in FIG. 15, the decorative part 1 and the wheel 31 are designed in a manner such that by attaching the decorative part 1 to the wheel 31, although the inner linear convex portion 43A will engage with the first plate-shaped ribs 21A and the second plate-shaped ribs 22A, there will also occur a gap G1 formed between the inner wall portion 19A and the wheel 31; a gap G2 formed between the outer wall portion 20A and the wheel 31; a gap G3 formed between the first plate-shaped ribs 21A and the wheel 31; and a gap G4 formed between the second plate-shaped ribs 22A and the wheel 31. That is, these gaps are present with the decorative part 1 being attached to the wheel 31. Thus, even when there occurs manufacturing variations in the sizes of the decorative part 1 and the wheel 31, these gaps G1, G2, G3, G4 can absorb the size variations. Further, the decorative part 1 can also be prevented from colliding with the wheel 31 and leaving scars thereon due to, for example, the vibration occurring at the time the vehicle is running. In addition, the decorative part 1 and the wheel 31 are designed in a manner such that the gaps G1, G2, G3 and G4 shall also respectively occur between the inner wall portion 19B and the wheel 31; the outer wall portion 20B and the wheel 31; the first plate-shaped ribs 21B and the wheel 31; the second plate-shaped ribs 22B and the wheel 31.

Figure 12:
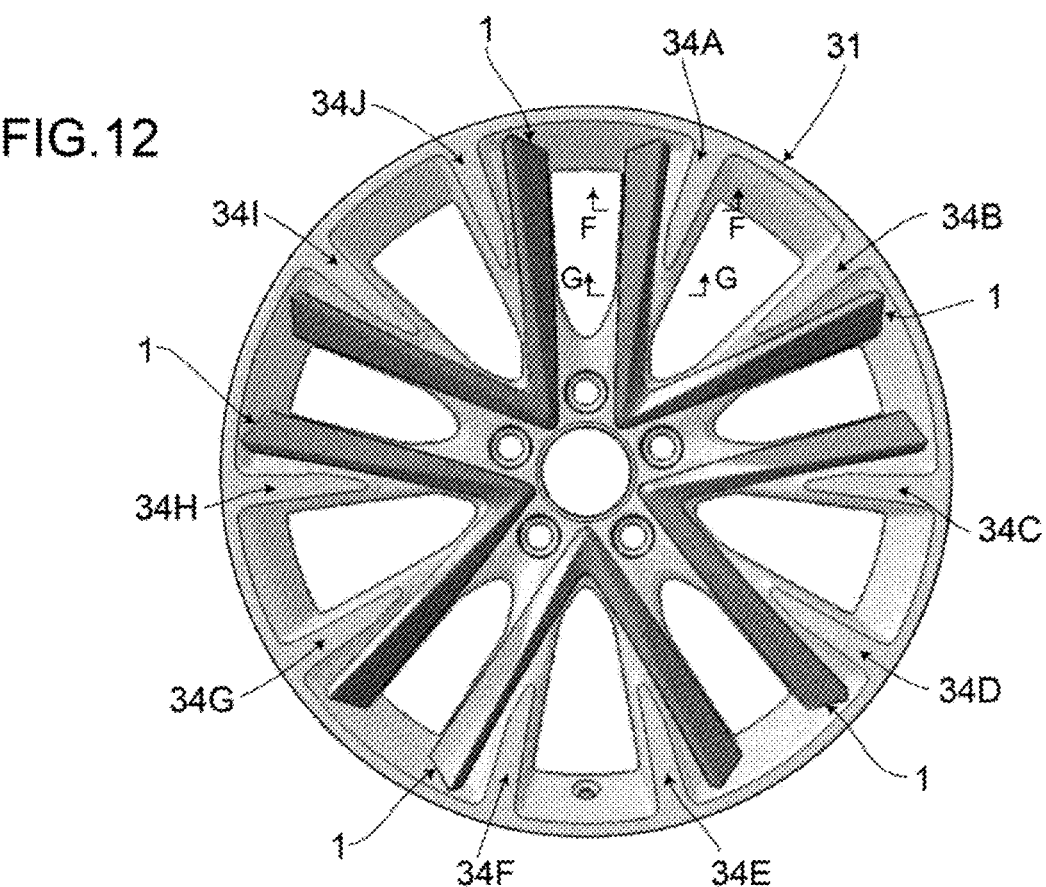
FIG. 12 is a front view showing a state where the decorative part is attached to the wheel in the first embodiment.
Figure 13:
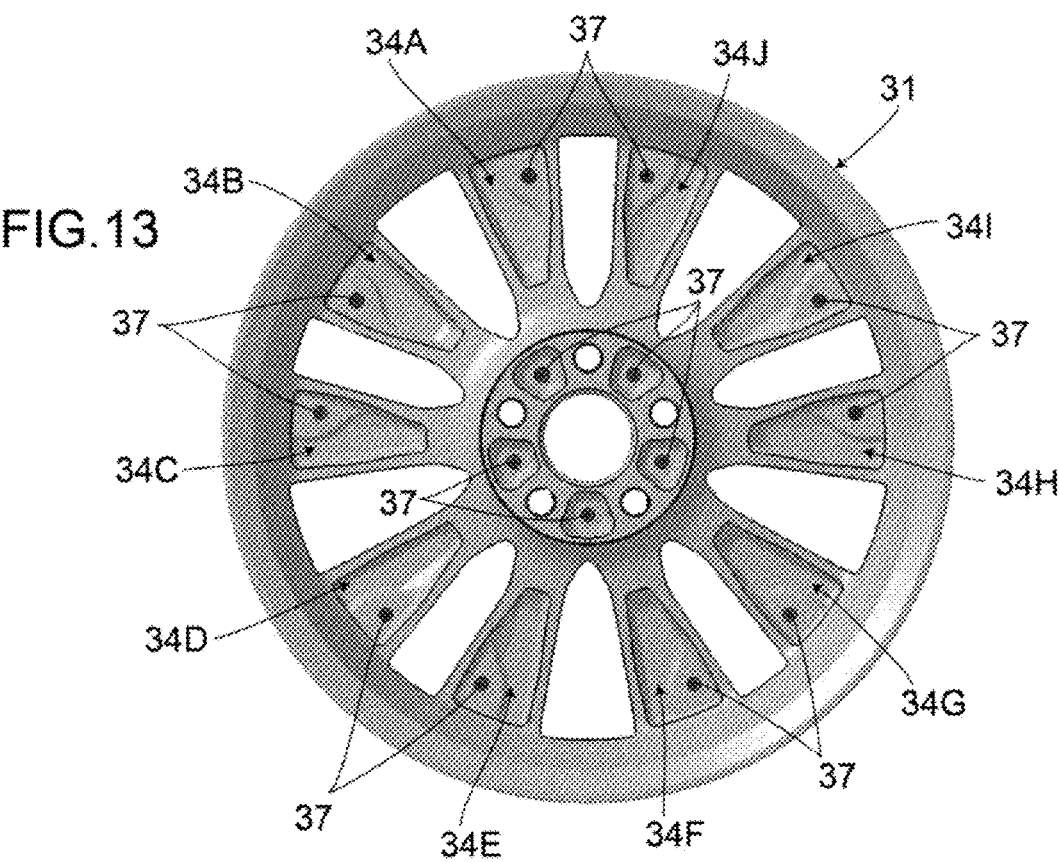
FIG. 13 is a rear view showing the state where the decorative part is attached to the wheel in the first embodiment.
Figure 14:
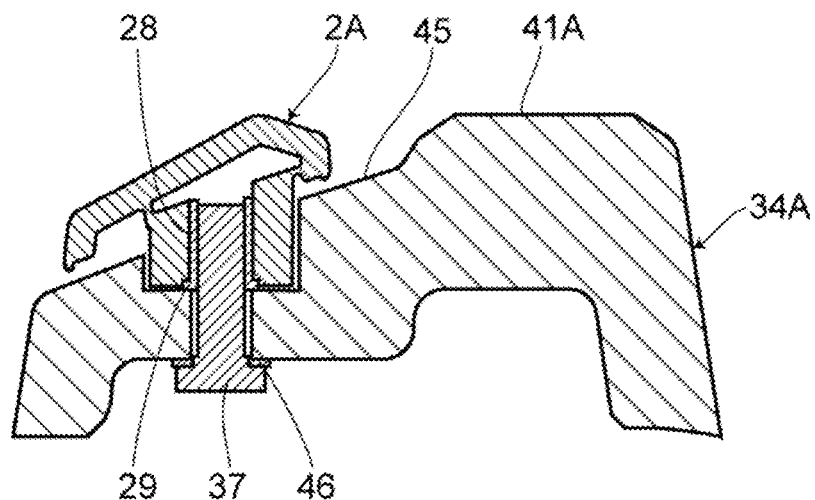
FIG. 14 is an F-F cross-sectional view of the decorative part and the wheel of the first embodiment.

Due to the gaps G1, G2, G3 and G4, an external light(s) such as sunlight will enter between the decorative part 1 and the wheel 31 from the sides where the inner wall portions 19A, 19B are provided, and the sides where the outer wall portions 20A, 20B are provided. As a result of allowing the light that has entered from one of the inner wall portion 19A, 19B side and the outer wall portion 20A, 20B side to travel straight and then exit from the other of the inner wall portion 19A, 19B side and the outer wall portion 20A, 20B side, the gap between the decorative part 1 and the wheel 31 will become noticeable to give an impression that the decorative part 1 and the wheel 31 are separated from each other. Since a person outside the vehicle usually sees the wheel 31 attached to the vehicle from an upper oblique direction, not from the front direction as shown in FIG. 12, the gap can be recognized more easily as the light passes between the decorative part 1 and the wheel 31. However, in this embodiment, since there are provided the linear convex portions 42A to 42J, the light that has entered between the decorative part 1 and the wheel 31 cannot travel straight due to these linear convex portions 42A to 42J so that the amount of the light exiting from the other side(s) will be reduced. In this way, the gap between the decorative part 1 and the wheel 31 is less noticeable so that the decorative part 1 and the wheel 31 can be seen as provided in an integrated fashion.

As described above, the decorative part 1 of this embodiment is the decorative part 1 to be attached to the wheel 31 of the vehicle. The decorative part 1 has the fixation portions 12, 13A, 13B to be fixed to the wheel 31; and the first plate-shaped ribs 21A, 21B as the first positioning portions and the second plate-shaped ribs 22A, 22B as the second positioning portions, the first plate-shaped ribs 21A, 21B and the second plate-shaped ribs 22A, 22B being engageable with the linear convex portions 42A to 42J linearly extended on the wheel 31. The first plate-shaped ribs 21A, 21B and the second plate-shaped ribs 22A, 22B have the given clearances L, L', and are formed on the rear surface 7 facing the wheel 31. Thus, by arranging the linear convex portions 42A to 42J formed on the wheel 31 in between the first plate-shaped ribs 21A, 21B and the second plate-shaped ribs 22A, 22B, the decorative part 1 can be fixed to the wheel 31 with the linear convex portions 42A to 42J being engaged with and positioned to the first plate-shaped ribs 21A, 21B and the second plate-shaped ribs 22A, 22B.

Further, the decorative part 1 of this embodiment is configured as follows. The first plate-shaped ribs 21A, 21B and the second plate-shaped ribs 22A, 22B are plate-shaped ribs. Since the first plate-shaped ribs 21A, 21B and the second plate-shaped ribs 22A, 22B are substantially extended parallel to the rotation direction of the wheel 31 with the decorative part 1 being attached to the wheel 31, a load occurring in the rotation direction of the wheel 31 will be applied not to the shorter-side directions but to the longer-side directions of the first plate-shaped ribs 21A, 21B and the second plate-shaped ribs 22A, 22B, thereby making it difficult for the first plate-shaped ribs 21A, 21B and the second plate-shaped ribs 22A, 22B to be deformed by such load. Thus, it is easier to maintain the position of the decorative part 1 to the wheel 31 even when the vehicle suddenly accelerates or decelerates.

Further, the decorative part 1 of this embodiment is also configured as follows. That is, since the first plate-shaped ribs 21A, 21B and the second plate-shaped ribs 22A, 22B are plate-shaped ribs, and since the first plate-shaped ribs 21A, 21B and the second plate-shaped ribs 22A, 22B are extended in the direction orthogonal to the longitudinal direction of the decorative part 1, sink marks can be restricted from occurring on the front surface 6 of the decorative part 1.

Furthermore, the decorative part 1 of this embodiment is also configured in the way such that since the first plate-shaped ribs 21A, 21B and the second plate-shaped ribs 22A, 22B are not arranged in a straight line, but are arranged in the parallel and staggered manner, the first plate-shaped ribs 21A, 21B and the second plate-shaped ribs 22A, 22B are distant from one another such that sink marks can be restricted from occurring on the front surface 6 of the decorative part 1.

Moreover, the wheel 31 of this embodiment has the rim portion 32, the hub portion 33 and the spoke portions 34A to 34J. The wheel 31 is a vehicular wheel to which the decorative part 1 can be attached. The wheel 31 further has the fixation receiving portions 39A to 39O for receiving the fixation portions 12, 13A and 13B that are formed on the decorative part 1; and the linear convex portions 42A to 42J that are linearly extended and are capable of engaging with the first plate-shaped ribs 21A, 21B and the second plate-shaped ribs 22A, 22B which are formed on the decorative part 1. Since the linear convex portions 42A to 42J are formed on the front surface 6 facing the decorative part 1, by arranging these linear convex portions 42A to 42J in between the first plate-shaped ribs 21A, 21B and the second plate-shaped ribs 22A, 22B, the decorative part 1 can be fixed with the linear convex portions 42A to 42J being engaged with and positioned to the first plate-shaped ribs 21A, 21B and the second plate-shaped ribs 22A, 22B. Further, a groove(s) or the like does not need to be formed on the wheel 31 so that the limitation on the design of the wheel 31 can be restricted to its minimum.

In addition, the fixation structure of the decorative part 1 and the wheel 31 in this embodiment is such that by fixing the fixation portions 12, 13A, 13B to the fixation receiving portions 39A to 39O with the linear convex portions 42A to 42J being engaged with the first plate-shaped ribs 21A, 21B and the second plate-shaped ribs 22A, 22B, the decorative part 1 can be fixed to the wheel 31 in an already positioned manner. Further, a groove(s) or the like does not need to be formed on the wheel 31 so that the limitation on the design of the wheel 31 can be restricted to its minimum. Furthermore, since the light entering between the decorative part 1 and the wheel 31 from one side can be prevented from exiting from the other side, the decorative part 1 and the wheel 31 can be visually recognized as provided in an integrated fashion.

Second Embodiment

Figure 16:
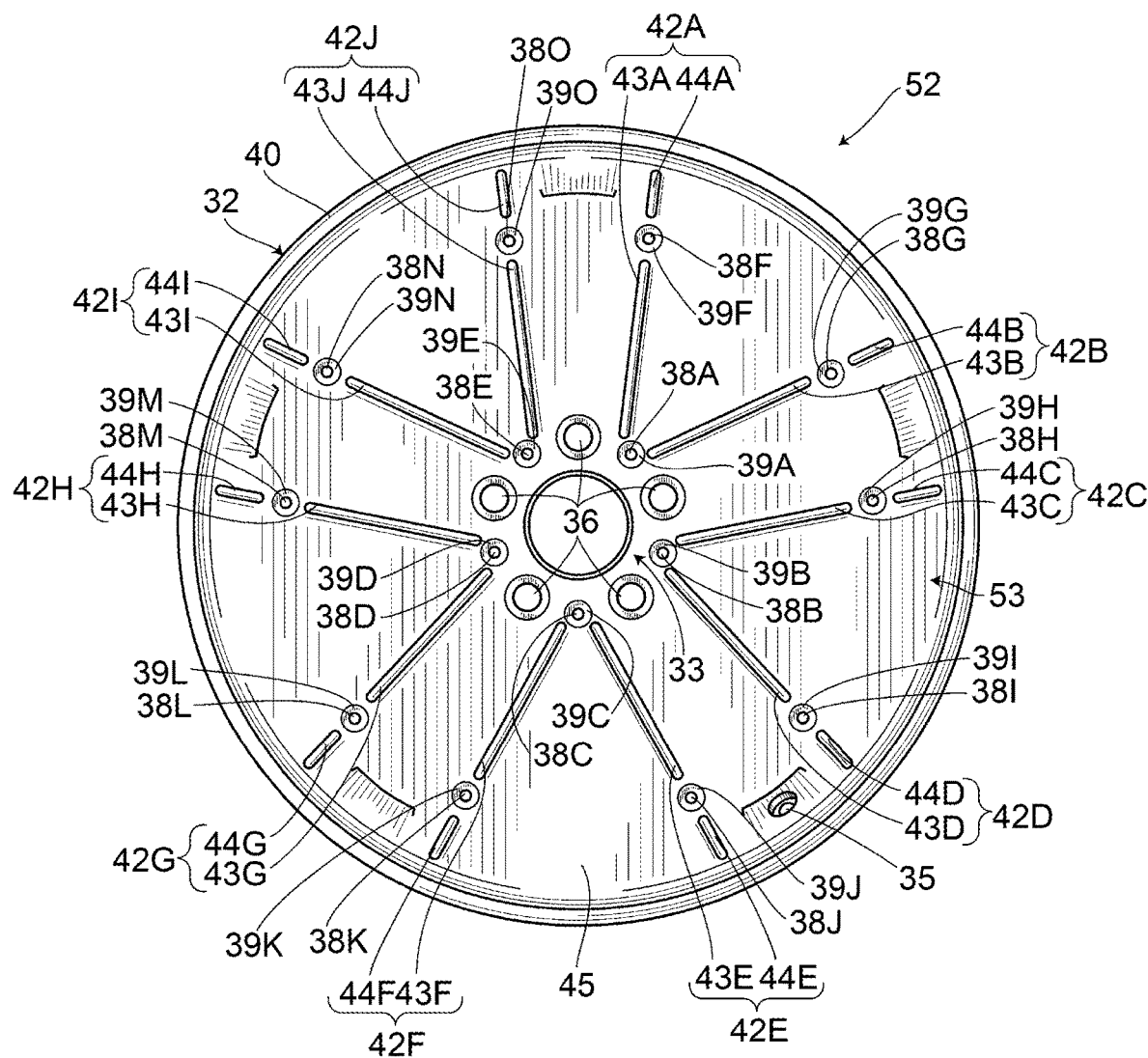
FIG. 16 is a front view of a wheel of a second embodiment of the invention.
Figure 17:
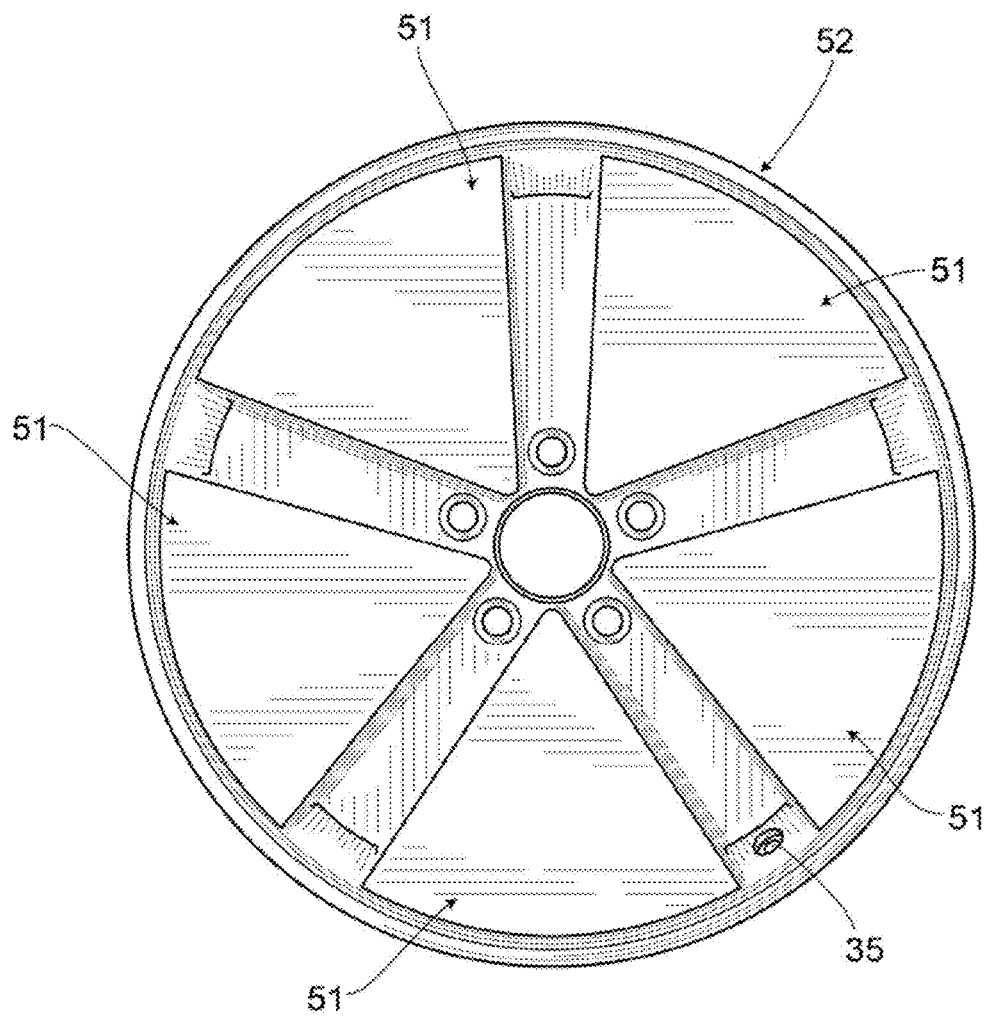
FIG. 17 is a front view showing a state where a decorative part is attached to the wheel in the second embodiment.

A second embodiment of the present invention is shown in FIG. 16 and FIG. 17. Elements identical to those in the first embodiment are given identical symbols. While the detailed descriptions of these elements are thus omitted, the second embodiment is described in detail hereunder. In this embodiment, there are used a decorative part 51 and a wheel 52 that have shapes different from those in the first embodiment.

The decorative part 51 is substantially formed into the shape of a sector. Further, the wheel 52 is configured in a way such that the rim portion 32 and the hub portion 33 are joined together not through the spoke portions 34A to 34J, but through a disk portion 53. Here, the flat surface portions 41A to 41J of the first embodiment are not formed on the wheel 52. Other configurations are identical to those in the first embodiment.

A method for attaching the decorative part 51 to the wheel 52 is similar to that described in the first embodiment. Specifically, the insert nuts 28 are to be embedded into the embedding holes 17, 18A, 18B of the fixation portions 12, 13A, 13B. Next, the fixation portions 12, 13A, 13B of the decorative part 51 are to be respectively arranged inside the fixation receiving portions 39A, 39F, 39G of the wheel 52. At that time, the linear convex portion 42A of the wheel 52 is to be arranged between the first plate-shaped ribs 21A and the second plate-shaped ribs 22A of the decorative part 51; the linear convex portion 42B is to be arranged between the first plate-shaped ribs 21B and the second plate-shaped ribs 22B; and the inner linear convex portion 43A and the inner linear convex portion 43B are to be arranged between the third plate-shaped ribs 25A and the third plate-shaped ribs 25B. Here, the linear convex portion 42A is to be engaged with the first plate-shaped ribs 21A and the second plate-shaped ribs 22A; the inner linear convex portion 43A is to be engaged with the third plate-shaped ribs 25A; and the inner linear convex portion 43B is to be engaged with the third plate-shaped ribs 25B. Next, the bolts 37 inserted through the stainless washers 46 are to be inserted through the insertion holes 38A, 38F and 38G from the rear side of the wheel 52 so as to allow the bolts 37 and the insert nuts 28 to be screwed together. The other four decorative parts 51 are then to be attached to the wheel 52 in a similar manner.

As described above, the wheel 52 of this embodiment has the rim portion 32, the hub portion 33 and the disk portion 53. The wheel 52 is a vehicular wheel to which the decorative part 51 can be attached. The wheel 52 further has the fixation receiving portions 39A to 39O for receiving the fixation portions 12, 13A, 13B that are formed on the decorative part 51; and the linear convex portions 42A to 42J that are linearly extended and are engageable with the first plate-shaped ribs 21A, 21B as the first positioning portions formed on the decorative part 51 and with the second plate-shaped ribs 22A, 22B as the second positioning portions formed on the decorative part 51. Particularly, the linear convex portions 42A to 42J are formed on the front surface 45 facing the decorative part 51. In this way, by arranging the linear convex portions 42A to 42J in between the first plate-shaped ribs 21A, 21B and the second plate-shaped ribs 22A, 22B, the decorative part 51 can be fixed with the linear convex portions 42A to 42J being engaged with and positioned to the first plate-shaped ribs 21A, 21B and the second plate-shaped ribs 22A, 22B. Further, a groove(s) or the like does not need to be formed on the wheel 52 so that the limitation on the design of the wheel 52 can be restricted to its minimum.

Third Embodiment

Though not shown, this embodiment is an embodiment where the first plate-shaped ribs 21A, 21B and the second plate-shaped ribs 22A, 22B in the first embodiment are provided on the spoke portions 34A to 34J of the wheel 31, the third plate-shaped ribs 25A, 25B are provided on the hub portion 33 of the wheel 31, and the linear convex portions 42A to 42J are provided on the rear surface(s) 7 of the first main body portion 2A and the second main body portion 2B of the decorative part 1. The linear convex portions 42A to 42J are extended in the longitudinal directions of the first main body portion 2A and the second main body portion 2B.

As described above, the decorative part 1 of this embodiment is a decorative part to be attached to the wheel 31 of the vehicle. This decorative part 1 has the fixation portions 12, 13A, 13B to be fixed to the wheel 31; and the linear convex portions 42A to 42J that are formed linearly and are engageable with the first plate-shaped ribs 21A, 21B as the first positioning portions formed on the wheel 31 and with the second plate-shaped ribs 22A, 22B as the second positioning portions formed on the wheel 31. Particularly, the linear convex portions 42A to 42J are formed on the rear surface 7 facing the wheel 31, and are extended in the longitudinal direction of the decorative part 1. In this way, by arranging the linear convex portions 42A to 42J in between the first plate-shaped ribs 21A, 21B and the second plate-shaped ribs 22A, 22B that are formed on the wheel 31, the decorative part 1 can be fixed to the wheel 31 with the linear convex portions 42A to 42J being engaged with and positioned to the first plate-shaped ribs 21A, 21B and the second plate-shaped ribs 22A, 22B. Further, even when the decorative part 1 has expanded or contracted, by heat, in the longitudinal directions of the first main body portion 2A and the second main body portion 2B, the linear convex portions 42A to 42J can still be arranged and positioned in between the first plate-shaped ribs 21A, 21B and the second plate-shaped ribs 22A, 22B.

Further, the wheel 31 of this embodiment has the rim portion 32, the hub portion 33 and the spoke portions 34A to 34J. The wheel 31 is a vehicular wheel to which the decorative part 1 can be attached. This wheel 31 has the fixation receiving portions 39A to 39O for receiving the fixation portions 12, 13A, 13B formed on the decorative part 1; and the first plate-shaped ribs 21A, 21B and the second plate-shaped ribs 22A, 22B that are engageable with the linear convex portions 42A to 42J formed on the decorative part 1. Particularly, the first plate-shaped ribs 21A, 21B and the second plate-shaped ribs 22A, 22B are formed at a given interval P on the front surface 45 facing the decorative part 1. In this way, by arranging the linear convex portions 42A to 42J formed on the decorative part 1 in between the first plate-shaped ribs 21A, 21B and the second plate-shaped ribs 22A, 22B that are formed on the wheel 31, the decorative part 1 can be fixed to the wheel 31 with the linear convex portions 42A to 42J being engaged with and positioned to the first plate-shaped ribs 21A, 21B and the second plate-shaped ribs 22A, 22B.

In addition, the fixation structure of the decorative part 1 and the wheel 31 in this embodiment is such that by fixing the fixation portions 12, 13A, 13B to the fixation receiving portions 39A to 39O with the linear convex portions 42A to 42J being engaged with the first plate-shaped ribs 21A, 21B and the second plate-shaped ribs 22A, 22B, the decorative part 1 can be fixed to the wheel 31 with the linear convex portions 42A to 42J formed on the decorative part 1 being arranged in between and positioned to the first plate-shaped ribs 21A, 21B and the second plate-shaped ribs 22A, 22B that are formed on the wheel 31.

However, the present invention is not limited to the above embodiments, and various modified embodiments are possible within the scope of the gist of the present invention. For example, as for a decorative part and a wheel, as long as the decorative part can be attached to the wheel with the linear convex portions 42A to 42J being arranged in between the first plate-shaped ribs 21A, 21B and the second plate-shaped ribs 22A, 22B, there shall be no restrictions on the shapes of the decorative part 1 and the wheel 31 in the first and third embodiments as well as the shapes of the decorative part 51 and the wheel 52 in the second embodiment i.e. various types of shapes may be selected.

What is claimed is:

1. A decorative part to be attached to a wheel of a vehicle, comprising:
   at least one fixation portion to be fixed to the wheel; and
   at least one first positioning portion and at least one second positioning portion that are engageable with at least one linear convex portion linearly extended on the wheel,
   wherein the first positioning portion and the second positioning portion are plate-shaped ribs,
   wherein the first positioning portion and the second positioning portion are formed at given intervals on a rear surface facing the wheel and
   wherein the linear convex portion is arranged in between the first positioning portions and the second positioning portions with the decorative part being attached to the wheel.

2. The decorative part according to claim 1, wherein the first positioning portion and the second positioning portion are substantially extended parallel to a rotation direction of the wheel with the decorative part being attached to the wheel.

3. The decorative part according to claim 1, wherein the first positioning portion and the second positioning portion are extended in a direction orthogonal to a longitudinal direction of the decorative part.

4. The decorative part according to claim 2, wherein the first positioning portion and the second positioning portion are not arranged in a straight line, but are arranged in a parallel and staggered manner.

5. The decorative part according to claim 3, wherein the first positioning portion and the second positioning portion are not arranged in a straight line, but are arranged in a parallel and staggered manner.

6. A vehicular wheel to which the decorative part as set forth in claim 1 can be attached, comprising:
a rim portion;
a hub portion;
at least one spoke portion or a disk portion;
at least one fixation receiving portion for receiving the fixation portion formed on the decorative part; and
the linearly extended linear convex portion engageable with the first positioning portion and the second positioning portion that are formed on the decorative part,
wherein the linear convex portion is formed on a front surface facing the decorative part, and
wherein the linear convex portion is arranged in between the first positioning portions and the second positioning portions with the decorative part being attached to the wheel.

7. A vehicular wheel to which the decorative part as set forth in claim 2 can be attached, comprising:
a rim portion;
a hub portion;
at least one spoke portion or a disk portion;
at least one fixation receiving portion for receiving the fixation portion formed on the decorative part; and
the linearly extended linear convex portion engageable with the first positioning portion and the second positioning portion that are formed on the decorative part,
wherein the linear convex portion is formed on a front surface facing the decorative part, and
wherein the linear convex portion is arranged in between the first positioning portions and the second positioning portions with the decorative part being attached to the wheel.

8. A vehicular wheel to which the decorative part as set forth in claim 3 can be attached, comprising:
a rim portion;
a hub portion;
at least one spoke portion or a disk portion;
at least one fixation receiving portion for receiving the fixation portion formed on the decorative part; and
the linearly extended linear convex portion engageable with the first positioning portion and the second positioning portion that are formed on the decorative part,
wherein the linear convex portion is formed on a front surface facing the decorative part, and
wherein the linear convex portion is arranged in between the first positioning portions and the second positioning portions with the decorative part being attached to the wheel.

9. A vehicular wheel to which the decorative part as set forth in claim 4 can be attached, comprising:
a rim portion;
a hub portion;
at least one spoke portion or a disk portion;
at least one fixation receiving portion for receiving the fixation portion formed on the decorative part; and
the linearly extended linear convex portion engageable with the first positioning portion and the second positioning portion that are formed on the decorative part,
wherein the linear convex portion is formed on a front surface facing the decorative part, and
wherein the linear convex portion is arranged in between the first positioning portions and the second positioning portions with the decorative part being attached to the wheel.

10. A vehicular wheel to which the decorative part as set forth in claim 5 can be attached, comprising:
a rim portion;
a hub portion;
at least one spoke portion or a disk portion;
at least one fixation receiving portion for receiving the fixation portion formed on the decorative part; and
the linearly extended linear convex portion engageable with the first positioning portion and the second positioning portion that are formed on the decorative part,
wherein the linear convex portion is formed on a front surface facing the decorative part, and
wherein the linear convex portion is arranged in between the first positioning portions and the second positioning portions with the decorative part being attached to the wheel.

11. A fixation structure of the decorative part as set forth in claim 1 and a vehicular wheel having a rim portion, a hub portion and at least one spoke portion or a disk portion, the vehicular wheel comprising:
at least one fixation receiving portion for receiving the fixation portion formed on the decorative part; and
the linearly extended linear convex portion engageable with the first positioning portion and the second positioning portion that are formed on the decorative part, the linear convex portion being formed on a front surface facing the decorative part,
wherein the linear convex portion is arranged in between the first positioning portions and the second positioning portions with the decorative part being attached to the wheel, and
wherein the fixation portion and the fixation receiving portion are to be fixed with the linear convex portion being engaged with the first positioning portion and the second positioning portion.

12. A fixation structure of the decorative part as set forth in claim 2 and a vehicular wheel having a rim portion, a hub portion and at least one spoke portion or a disk portion, the vehicular wheel comprising:
at least one fixation receiving portion for receiving the fixation portion formed on the decorative part; and
the linearly extended linear convex portion engageable with the first positioning portion and the second positioning portion that are formed on the decorative part, the linear convex portion being formed on a front surface facing the decorative part,
wherein the linear convex portion is arranged in between the first positioning portions and the second positioning portions with the decorative part being attached to the wheel, and
wherein the fixation portion and the fixation receiving portion are to be fixed with the linear convex portion being engaged with the first positioning portion and the second positioning portion.

13. A fixation structure of the decorative part as set forth in claim 3 and a vehicular wheel having a rim portion, a hub portion and at least one spoke portion or a disk portion, the vehicular wheel comprising:
  at least one fixation receiving portion for receiving the fixation portion formed on the decorative part; and
  the linearly extended linear convex portion engageable with the first positioning portion and the second positioning portion that are formed on the decorative part, the linear convex portion being formed on a front surface facing the decorative part,
  wherein the linear convex portion is arranged in between the first positioning portions and the second positioning portions with the decorative part being attached to the wheel, and
  wherein the fixation portion and the fixation receiving portion are to be fixed with the linear convex portion being engaged with the first positioning portion and the second positioning portion.

14. A fixation structure of the decorative part as set forth in claim 4 and a vehicular wheel having a rim portion, a hub portion and at least one spoke portion or a disk portion, the vehicular wheel comprising:
  at least one fixation receiving portion for receiving the fixation portion formed on the decorative part; and
  the linearly extended linear convex portion engageable with the first positioning portion and the second positioning portion that are formed on the decorative part, the linear convex portion being formed on a front surface facing the decorative part,
  wherein the linear convex portion is arranged in between the first positioning portions and the second positioning portions with the decorative part being attached to the wheel, and
  wherein the fixation portion and the fixation receiving portion are to be fixed with the linear convex portion being engaged with the first positioning portion and the second positioning portion.

15. A fixation structure of the decorative part as set forth in claim 5 and a vehicular wheel having a rim portion, a hub portion and at least one spoke portion or a disk portion, the vehicular wheel comprising:
  at least one fixation receiving portion for receiving the fixation portion formed on the decorative part; and
  the linearly extended linear convex portion engageable with the first positioning portion and the second positioning portion that are formed on the decorative part, the linear convex portion being formed on a front surface facing the decorative part,
  wherein the linear convex portion is arranged in between the first positioning portions and the second positioning portions with the decorative part being attached to the wheel, and
  wherein the fixation portion and the fixation receiving portion are to be fixed with the linear convex portion being engaged with the first positioning portion and the second positioning portion.

* * * * *